United States Patent Office 3,532,881
Patented Oct. 6, 1970

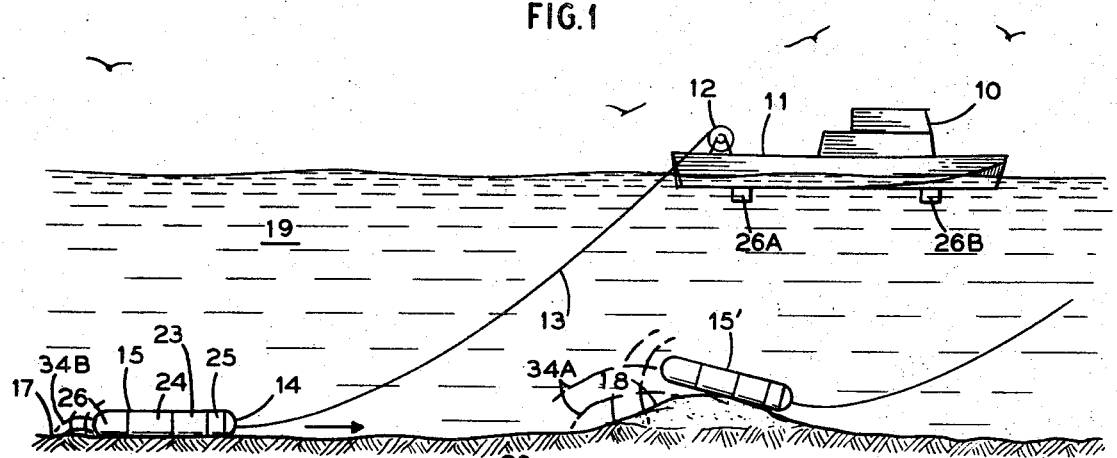
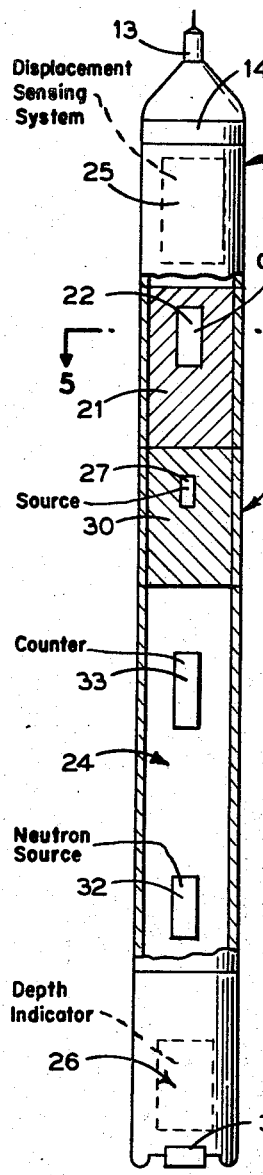
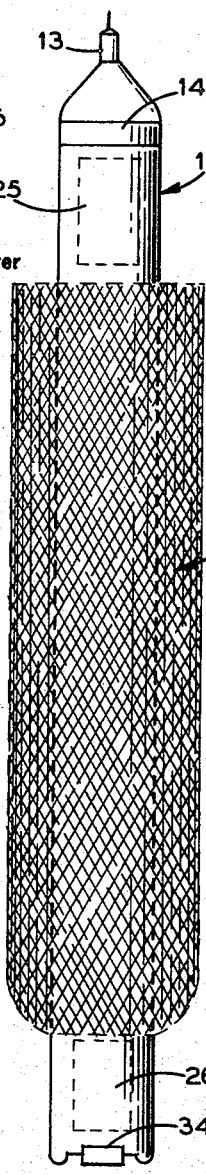
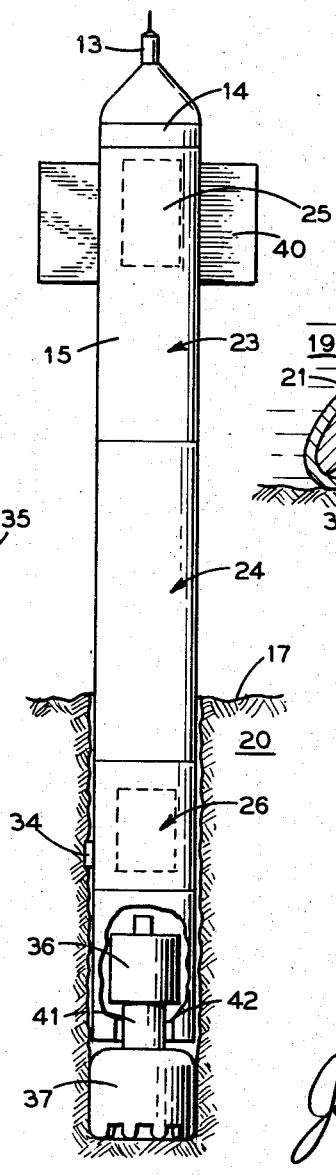
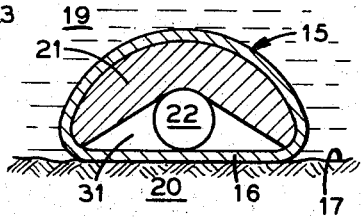

3,532,881
SUBMARINE RADIOACTIVITY LOGGING TECHNIQUE
John T. Dewan, Houston, Tex., assignor to Schlumberger Technology Corporation, New York, N.Y., a corporation of Texas
Filed Jan. 5, 1968, Ser. No. 695,897
Int. Cl. G01n 23/12
U.S. Cl. 250—43.5   6 Claims

ABSTRACT OF THE DISCLOSURE

A typical embodiment of the invention enables characteristics of the bottom of a body of water to be measured and located with accuracy. Radioactivity logging equipment is housed within a sled that is towed along the bottom to scoop up mineral nodules or bottom samples in a mesh or grid. The sled and samples are lifted by the towing cable about ten feet off the bottom to provide a suitable environment for gamma radiation spectrum analysis. The elevation above the bottom is measured by a fathometer within the sled. Hydrophone equipment on board the towing vessel responds to the sound pulses emitted by the fathometer in order to fix the position of the sled relative to known geographical references and thereby establish the precise location of each sample measurement. Optionally, an integral drill bit is fixed to one end of the sled for the purpose of boring through sediment.

BACKGROUND OF THE INVENTION

Field of the invention

This invention relates to underwater prospecting methods and apparatus and, more particularly, to an improved radioactive logging technique for accurately logging underwater mineral deposits, and the like.

Description of the prior art

As the need for raw materials increase and conventional deposits become exhausted, underwater prospecting techniques to locate new mineral concentrations take on substantial industrial importance. Different proposals have been advanced to satisfy the special requirements imposed by prospecting in this unusual environment. For example, one proposal suggests enclosing a gamma radiation counter within a water-tight pressure housing. A towing vessel drags the housing and the counter along the bottom in question. The counter responds to the radiation emanating from the surface under investigation by producing a signal that corresponds to a profile of the gamma radiation naturally emitted from the portion of the bottom traversed by the housing. A log of this sort enables geologists and mining engineers to recognize commercially interesting accumulations of naturally radioactive elements.

Natural radioactivity, however, is not the only bottom characteristic of interest. For example, economically significant deposits of mineral nodules containing copper, nickel or manganese are known to be present on the ocean floor. The rapid, accurate and inexpensive identification of these deposits is, of course, very desirable. Other bottom features also are important, such as the density of the sediment under investigation. No underwater prospecting device capable of making these measurements has been suggested in the prior art.

Those proposed natural radioactivity devices that have been suggested, in addition to providing only a limited amount of information about the bottom are subject to navigation errors. Tides, wave action and currents are among the many forces that can shift the position of the detector relative to the towing vessel by an unknown amount. This degree of error prevents an accurate chart of the bottom radioactivity characteristics from being prepared.

Accordingly, it is an object of the invention to provide an improved radioactivity logging apparatus in order to identify the characteristics of the bottom of a body of water.

It is still another object of the invention to provide an improved method and apparatus for indicating the proximity of an underwater radioactivity logging device with the bottom of a body of water.

It is still a further object of the invention to provide an improved technique that accurately fixes the position of an underwater radioactivity logging device.

It is still a further object of the invention to provide an improved technique for subjecting a sample of the bottom of a body of water to radioactivity analysis.

SUMMARY

A towed underwater prospecting device in accordance with the invention comprises a water-tight sled. The sled is formed with a substantially flat working surface on at least a portion of one side in order to engage the bottom of a body of water without being subject to a rolling motion. Apparatus for measuring the density of the sediment on the ocean floor is enclosed within the sled adjacent to the flattened working surface. A typical gamma radiation density measuring apparatus for use with the invention is described in more complete detail in U.S. Pat. No. 3,263,083, granted on July 26, 1966 to F. F. Johnson et al. for "High Resolution Apparatus Using a Gamma Ray Source and Detector for Investigating Earth Formations" and assigned to the assignee of the present invention.

A further embodiment of the invention enables critical elements to be identified through gamma radiation analysis with the aid of a porous dredging apparatus. The dredge is interposed between the outer surface of the sled and the bottom under investigation. The dredge typically can be formed from foam plastic, wire mesh or some other suitable labyrinthine structure, in order to scrape up and temporarily hold sediment from the bottom. After towing the sled to fill the dredge passageways with an acceptable bottom sample, the entire assembly is raised within the water to a vertical position about ten feet above the bottom. Preferably this distance is measured with an ultrasonic reflectoscope or fathometer on the sled. The fathometer emits sound pulses that measure the separation in question.

After raising the sled, the entire assembly is agitated by quickly reeling in and paying out short lengths of the towing cable in order to rinse silt and other fine particulate matter out of the dredge, while retaining the larger mineral aggregate within the passageways. Alternatively, a propeller associated with the sled can be used to pump a stream of water through the passageways to wash the silt out of the dredge. The aggregate so retained in the dredge structure is subjected to radioactive analytical techniques in order to provide an indication of the mineral structure of the bottom. An exemplary technique for carrying out measurements of this type is described in more complete detail in U.S. patent application Ser. No. 616,971, filed on Feb. 17, 1967 by James H. Moran and Jay Tittman for "Analysis of Gamma Ray Energy Spectrum for Constituent Identification" and assigned to the assignee of the present invention.

In order to analyze the mineral character of the sediment at some depth below the surface, a drill bit optionally is coupled to a motor within one end of the sled. The drill bit enables the sled to bore into the sediment in order to conduct a radioactive analysis of the mineral structure either in situ or with the aid of the dredge as hereinbefore described.

The invention further provides for the accurate location of the sled relative to the towing vessel. For example, the sound pulses emitted by the fathometer may be received by hydrophones on the towing vessel in order to fix the position of the sled during the logging run. An inertial displacement sensing system within the sled, moreover, is another one of the many possible devices that can be used for this purpose.

For a better understanding of the present invention, together with other and further objects thereof, reference is had to the following description taken in conjunction with the accompanying drawings, the scope of the invention being pointed out in the appended claims.

BRIEF DESCRIPTION OF THE DRAWING

FIG. 1 is a schematic diagram of a typical system embodying the invention;

FIG. 2 is a schematic diagram in partial section of a typical sled in accordance with the invention, showing the radioactivity and electrical equipment in block diagram form;

FIG. 3 is a schematic diagram of another embodiment of the invention;

FIG. 4 is a schematic diagram in partial section of still another embodiment of the invention; and FIG. 5 is a transverse section of the embodiment of the invention shown in FIG. 2 taken along the line 5—5 thereof and looking in the direction of the arrows.

DESCRIPTION OF THE PREFERRED EMBODIMENTS

As shown in FIG. 1, a towing vessel 10, which carries electrical equipment for analyzing and recording logging signals as hereinafter described in more detail, has an afterdeck 11 to which a winch 12 is secured in order to pay out or reel in a waterproof cable 13. The cable 13 preferably comprises a group of electrical conductors embedded in a matrix of flexible insulating material that is protected by a serving of stranded armor. Underwater, the cable 13 is coupled to a swivel head 14 on the forward end of a pressure-tight instrumentation sled 15.

The sled 15, as shown in FIG. 5, is a hollow structure that has a flat working surface 16 at least over a portion of the length for engaging the bottom surface 17 of a body of water 19. The surface 17 is, as illustrated in FIGS. 1 and 5, the top of a layer of sediment 20 that ordinarily accumulates, for example, on the floor of an ocean, lake or river bed.

As described in the aforementioned Johnson et al. patent and in U.S. Pat. No. 3,321,627 granted to C. W. Tittle on May 23, 1967, the directional properties of the logging apparatus are enhanced to render the radioactivity equipment more responsive to the density of the sediment 20 and relatively insensitive to scattered radiation and the background radioactivity of the water 19. Accordingly, a shield 21 (FIG. 5), formed of lead or the like, is tailored to attenuate gamma radiation incident upon a gamma ray counter 22 from directions other than the bottom 17.

The counter 22 preferably comprises a scintillation crystal that responds to an incident gamma ray by producing a transient flash of light which has an intensity generally proportional to the energy transferred to the crystal by the gamma ray. A photomultiplier tube (not shown) is optically coupled to the crystal 22 and produces a charge pulse that is related to the intensity of the light flash and hence, to the energy deposited in the crystal by the incident radiation. Alternatively, other detectors, as for example, semiconductor detectors and the like, also can be used in connection with the invention.

Turning once more to FIG. 1, the sled 15 houses radioactivity analysis equipment, illustratively identified as a gamma ray density meter 23 and a gamma ray spectroscopic analysis tool 24.

In accordance with the invention, a displacement indicating or sensing system 25 is secured within the sled 15 just aft of the swivel head 14. The displacement system, which preferably is a gyroscopic or inertial device, indicates the position of the sled 15 relative to the vessel 10 in terms of horizontal coordinates. The displacement system 25 responds to sled movements that are perpendicular to the direction of tow and generates error signals that correspond to the magnitude of these sidewise sled movements.

The error signals are transmitted through conductors (not shown) in the cable 13 to appropriate electrical equipment (also not shown) on the vessel 10. These transverse sled movement signals when combined on the towing vessel 10 with the known length of the cable payed out, the depth of the sled, and the course and speed of the vessel 10 enable the position of the sled 15 to be fixed accurately relative to the towing vessel. The position of the vessel 10, of course, is determined relative to fixed geographical references through pilotage and the like to permit log analysis to draw up a precise radioactivity profile map of the bottom 17.

Because weight and volume do not impose stringent limitations on the sled 15, it may be preferable to incorporate a mutually perpendicular two- or three-coordinate displacement sensing system in the sled to provide a more accurate displacement measurement.

An additional feature of the invention, also shown schematically in FIG. 1, is a depth indicator 26, as for example, an ultrasonic reflectoscope or fathometer, that emits pulses of sonic energy 34A and 34B. These pulses are reflected from the bottom 17 back to the indicator 26. The time between pulse emission and reception is a measure of the separation between the sled and the bottom 17. Accordingly, changes in the quality of the contact between the sled 15 and the bottom 17 caused, for example, by towing the sled 15 in the direction of the arrow over an obstruction 18, are recorded to indicate those portions of the profile log that are subject to a source of error.

The depth indicator 26, moreover, measures the distance between the bottom surface 17 and the sled 15 when the sled is raised above the bottom for gamma ray analysis as described subsequently in more detail.

The depth indicator 26 also provides a means for fixing the position of the sled 15 relative to the towing vessel 10. In this connection, hydrophones 26A and 26B spaced from each other and secured to the wetted surface of the hull of the vessel 10 respond to the sound waves emitted from the indicator 26. By measuring, for example, the bearing and arrival times of the sound waves at the hydrophones 26A and 26B, the location of the sled 15 relative to the vessel 10 can be calculated.

A more specific embodiment of the invention is shown in FIG. 2. The sled 15 is coupled to the multiconductor cable 13 through the swivel head 14 in order to reduce torque that tends to twist the cable and cause the sled to roll.

The gamma ray density meter 23 within the sled 15 is positioned immediately abaft the inertial displacement sensing system 25. As shown schematically, the density meter 23 comprises the previously described gamma radiation counter 22, which is spaced forward in the sled from a gamma radiation source 27. Preferably, the source 27 comprises a capsule of cesium 137 ($Cs^{137}$) for emitting gamma rays that are scattered by the constituents of the sediment 20. Ordinarily, as described with regard to borehole logging in the aforementioned Johnson et al. and Tittle patents, the gamma rays scattered back by the electrons in the atomic structure of the sediment, in the present invention provide a measure of the bulk density of the bottom.

As hereinbefore mentioned, gamma radiation from the source 27 that is scattered through the water 19 (rather than through the sediment 20) and the natural radioactivity of the water 19 tends to degrade the quality of the signal from the counter 22. To reduce the influence of these unwanted radiations, the counter 22 is secured within the sled 15 adjacent to the working face 16 and shielded from gamma radiation that enters the sled from directions other than the bottom 17. The shield 21 has a wide aperture collimating slot 31 (FIG. 5) to enchance this directionally sensitive orientation of the counter.

The gamma ray spectroscopic analysis tool 24, of which the apparatus described in the foregoing Moran et al. patent application is typical, indicates not only the elements present in the sediment 20, but also provides a measure of the relative abundance of the elements so identified. For example, an electrically controlled pulse neutron source 32 emits carefully timed bursts of neutrons in order to irradiate the adjacent sediment 20. The neutrons from the pulse source 32 may have energies as high as about 14.1 million electron volts (Mev.). These high energy neutrons collide with the sediment nuclei and transfer energy to the nuclei through successive collisions until the average kinetic energy of the neutrons is the same as the thermal energy of the sediment. On reaching this condition of thermal equilibrium, neutrons are absorbed rapidly within the nuclei that comprise the bottom 17.

Usually, for each neutron that is absorbed in a nucleus, at least one gamma ray exhibiting an energy unique to the particular element is emitted from the nucleus so activated. Careful observation of the gamma radiation induced in the sediment 20 through preselected energy ranges with a scintillation counter 33 enables the presence and relative abundance of specific elements to be identified. Thus, for example, manganese, copper and nickel are known to exist in the form of nodules on the ocean floor, and are particularly suited to neutron activation analysis of this sort.

The signals from the counters 22 and 33 are coupled to a signal transmission circuit (not shown) in the sled 15. The transmission circuit preferably discriminates, amplifies and scales the counter signals in order to prepare these signals for further transmission through the conductors in the armored cable 13 to the appropriate circuits on the vessel 10.

In operation, the depth indicator 26 at the after end of the sled 15 has an external transducer 34 that emits high frequency pulses of sonic energy. As described in connection with FIG. 1, these pulses are transmitted through the water to the bottom 17. On reaching the bottom, each of the pulses are reflected back to the transducer 34 and the elapsed time between the transmission and return of the same pulse, if combined with the salinity and the temperature of the water, is an accurate index of the distance or separation between the transducer 34 and the bottom surface 17. Thus, the obstruction 18 pitches the after end of the sled 15' upwardly and away from the bottom 17. The pitching movement increases the length of time required for the schematically shown sound waves 34A to return to the sled. By contrast, when the contact between the working surface of the sled 15 is of good quality, the elapsed time between pulse tranmission and return is constant.

Consequently, by transmitting to the vessel 10 signals that correspond to the elapsed time between pulse transmission and reception, increases in the time (or decreases in this time) beyond a measured standard time difference shows that the contact between the sled and the bottom is unsatisfactory. In this circumstance the signals received from the counters 22 and 33 ought to be disregarded or corrected accordingly. These sound pulses, when received at the hydrophones 26A and 26B, also enable the position of the sled 15 to be determined through triangulation as, for example, by measuring the bearing of the sonic transducer 34 relative to the hydrophones which are separated by a fixed base line of known length.

A further embodiment of the invention is shown in FIG. 3. The portion of the sled 15 housing the neutron activation spectroscope is covered with a porous dredge 35 formed, for example, from a wire mesh or a porous foam plastic characterized by more or less labyrinthine passageways.

In operation, the sled 15 is dragged on the bottom 17 to enable the dredge 35 to trap a representative sample of the sediment within the interstices formed by the mesh or the pores. The tool then is raised to an upright position between about three to ten feet above the bottom 17 by the cable 13, as measured with the aid of the depth indicator 26. While upright, the sled 15 is agitated in the surrounding water, preferably by quickly reeling in said paying out short lengths of cable 13, to rinse clay, sand, silt and the like, out of the dredge 35. The larger mineral nodules or aggregates, however, are retained within the mesh or pore structure of the dredge 35. Alternatively, the housing 15 can be equipped with a propeller (not shown) or agitator to drive a stream of water through the dredge and thus rinse the silt out of the passageways.

The entrapped aggregate then is subjected to a radioactivity analysis as hereinbefore described, within the added advantages of isolation from the bottom 17 and the superior neutron thermalization characteristics of the water 19 thermal neutron activation analysis.

Further agitation, which may be of a more vigorous character depending on the mesh structure and the aggregate size, will shake the aggregate out of the dredge 35 and permit another sample to be taken. If desired, however, a selectively operated port (not shown) can be provided on the dredge. The port, when opened, enables the entrapped aggregate to be discharged more readily from the interstices. The mesh size or the porosity of the interstices in the dredge 35 can be chosen to correspond to the mean size of the specific aggregate under investigation.

Gamma ray analysis of the elements in the sediment 20 is not limited to the thermal neutron activation technique described above, but includes other techniques as, for example, the inelastically scattered gamma ray method.

A further embodiment of the invention (FIG. 4) enables the sled 15 to bore into the sediment and analyze deeper mineral deposits. The cable 13 is connected to the sled 15 through the swivel head 14. The sled 15 contains the inertial displacement sensing system 25, the gamma radiation density meter 23, the gamma ray spectrum analysis apparatus 24 and the depth indicator 26, in which the transducer 34 is secured to the side, rather than the after end of the sled.

An electric motor 36 is secured in the after end of the sled 15. The motor 36 drives a drill bit 37 through a drive shaft 41 that is supported by a bearing 42. Suitable reduction gearing also can be accommodated within the sled 15, if required by the physical characteristics of the motor, bit and sediment. In the embodiment of the invention shown in FIG. 4, the sled preferably is formed with a circular transverse cross section in order to match generally the shape of the hole bored by the bit 37.

Fins 40 are attached to the outer surface of the sled 15 to prevent the apparatus from rotating during drilling. Other means to prevent sled rotation also are within the scope of the invention, as for example, a selectively extendable tripod on a sliding collar that rides in vertical tracks secured to the outer surface of the sled 15. The tripod legs or bracing members can be extended selectively to penetrate the bottom 17 and prevent the tool from rotating with the drill bit 37 when the motor 36 is energized.

The embodiment of the invention shown in FIG. 4 is especially useful when the bottom surface 17 comprises a layer of easily penetrable silt that overlays a mineral deposit. In operation, the sled 15 is lowered vertically through the water 19 until the drill bit 37 engages the bottom 17. The motor 36 is energized to rotate the bit 37 and bore into the sediment 20. At a predetermined depth of penetration the density meter 23 and the gamma ray spectrum analysis apparatus 24 are activated in order to take the desired measurements.

If the sled 15 is stuck in the drill hole, the direction of motor commutator rotation can be reversed, the cable 13 can be swayed in an irregular manner to free the device, and the tripod bracing members (if the sled is so equipped) can be retracted to draw the sled upward and out of the drill hole. The dredge 35 (FIG. 3), moreover, can be combined with the embodiment of the invention shown in FIG. 4 in order to withdraw a sample of the lower sedimentary depths from the drill hole for radioactive analysis in the manner hereinbefore described.

Thus, there is provided in accordance with the invention an improved radioactivity logging apparatus for identifying and accurately locating minerals and other important underwater geological conditions. Naturally, the foregoing radioactivity logging equipment shown and described is for the purpose of illustration and is not by way of limitation. Thus, the exemplary radiation devices described herein are typical of the broad range of instruments suitable for use with the invention. The physical configuration of the sled 15 also may be modified within the terms of the invention. For example, the neutron activation apparatus 24 and the density tool 23 can be housed within one or more sled runners. The depth indicator 26, the displacement sensing system 25 and other equipment may in whole or in part be placed on a support attached to one or more of these runners.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. An underwater radioactivity logging apparatus comprising, a sled, radiation responsive apparatus within said sled for registering characteristics of the bottom of the body of water, and a displacement indicating system within the said sled to produce signals that identify the position of said sled, said displacement indicating system including means responsive to the inertia of said system for indicating sidewise movement of said sled.

2. A device according to claim 1 wherein said displacement indicating system comprises means responsive to said system inertia in mutually perpendicular directions to establish a plurality of signals that correspond to the relative movement of said sled.

3. A method for logging the radioactivity characteristics of the bottom of a body of water comprising, the steps of dragging a porous dredge on the bottom, filling the pores of said dredge with a sample of said bottom, raising said dredge above the bottom, rinsing all but a preselected portion of said bottom sample from said dredge within the water, and irradiating said preselected sample in order to log the radioactivity characteristics thereof.

4. The radioactivity logging apparatus for measuring characteristics of the bottom of a body of water comprising, a sled for traversing the bottom, radiation responsive apparatus within said sled for registering characteristics of the bottom, and depth indicating means on said sled to produce a sonic signal that indicates the separation between said sled and the bottom to establish the quality of said registered bottom characteristics.

5. A radioactivity logging apparatus for measuring characteristics of the bottom of a body of water comprising, a sled for traversing the bottom, radiation responsive apparatus within said sled for registering characteristics of the bottom, and a dredge secured to the outer surface of said sled adjacent to said radiation apparatus to acquire a sample of the bottom for radiation analysis.

6. An apparatus according to claim 5 wherein said dredge comprises a mesh having interstices for temporarily trapping said sample therein.

References Cited

UNITED STATES PATENTS

| | | | |
|---|---|---|---|
| 2,607,996 | 8/1952 | Moyer | 33—141.5 |
| 2,725,486 | 11/1955 | Walstrom | 33—305 |
| 2,781,453 | 2/1957 | Belcher et al. | |
| 2,942,111 | 6/1960 | Worthington. | |
| 3,159,745 | 12/1964 | Schrodt et al. | |
| 3,254,221 | 5/1966 | Saurenman. | |
| 3,255,353 | 6/1966 | Scherbatskoy. | |
| 3,321,625 | 5/1967 | Wahl. | |

FOREIGN PATENTS

| | | |
|---|---|---|
| 125,631 | 5/1959 | U.S.S.R. |
| 156,310 | 3/1962 | U.S.S.R. |

ARCHIE R. BORCHELT, Primary Examiner

U.S.Cl X.R.

250—83, 83.6